US012810318B1

(12) United States Patent
Nakulski

(10) Patent No.: US 12,810,318 B1
(45) Date of Patent: Nov. 24, 2026

(54) SYSTEMS AND METHODS FOR PSYCHOGRAPHIC-DRIVEN MULTICHANNEL PLAN GENERATION AND ORCHESTRATION

(71) Applicant: Rock Solid Marketing, LLC, Sheridan, WY (US)

(72) Inventor: William Nakulski, Des Plaines, IL (US)

(73) Assignee: Rock Solid Marketing, LLC, Sheridan, WY (US)

( * ) Notice: Subject to any disclaimer, the term of this patent is extended or adjusted under 35 U.S.C. 154(b) by 0 days.

(21) Appl. No.: 19/463,356

(22) Filed: Jan. 29, 2026

(51) Int. Cl.
*G06Q 30/0201* (2023.01)

(52) U.S. Cl.
CPC .............................. *G06Q 30/02012* (2025.08)

(58) Field of Classification Search
CPC ............................................... G06Q 30/02012
See application file for complete search history.

(56) References Cited

U.S. PATENT DOCUMENTS 9,626,684 B2 * 4/2017 Angell ............... G06Q 30/0267
10,192,225 B2 * 1/2019 Newman ................ G06Q 30/02
11,816,701 B2 * 11/2023 Smith ................ G06Q 30/0269
2006/0143084 A1 * 6/2006 Donnelli ............ G06Q 30/0273 705/14.69
2010/0043003 A1 * 2/2010 Valdez .................... G06F 9/542 718/103
2012/0101871 A1 * 4/2012 Lieberman ......... G06Q 30/0269 705/7.29
2014/0200997 A1 * 7/2014 Anderson .......... G06Q 30/0229 705/14.53
2015/0170213 A1 * 6/2015 O'Malley ............... H04W 4/12 705/14.42

(Continued)

FOREIGN PATENT DOCUMENTS

DE 202025103768 U1 * 8/2025 ............... G06N 3/08

OTHER PUBLICATIONS

Adobe Experience Cloud Team "Customer journey orchestration" (2025)(https://business.adobe.com/blog/basics/customer-journey-orchestration) (Year: 2025).*

*Primary Examiner* — Sujay Koneru
(74) *Attorney, Agent, or Firm* — The Rapacke Law Group, P.A.; Andrew S. Rapacke; Kenneth F. Brooks

(57) ABSTRACT

A computer system includes a processor and memory storing instructions that implement a data ingestion and normalization module to receive interaction data from multiple external systems and normalize the data into a common event format tied to a contact. A psychographic analyzing engine derives psychographic dimensions and flags from textual content and behavioral patterns. A data store maintains a Customer Context Record merging the psychographic dimensions and flags with behavioral statistics, channel preferences, current status, and a reference to an active plan. A directive plan generation engine produces an individualized directive plan comprising directives, each including a channel identifier, a template style selector, a timing rule, and a cancellation condition. An execution orchestration module reads the plan and triggers multichannel execution by issuing API calls while enforcing cancellation and tracking directive state. A feedback processing engine updates the record and regenerates the plan when an update condition is satisfied.

16 Claims, 6 Drawing Sheets

(56) References Cited

U.S. PATENT DOCUMENTS

| | | | | |
|---|---|---|---|---|
| 2015/0379562 | A1* | 12/2015 | Spievak | G06Q 10/0639 379/265.09 |
| 2016/0104191 | A1* | 4/2016 | Graziano | G06Q 30/0277 705/14.45 |
| 2016/0239857 | A1* | 8/2016 | Milton | G06Q 30/0201 |
| 2017/0052652 | A1* | 2/2017 | Denton | G06F 3/04847 |
| 2017/0213242 | A1* | 7/2017 | Sundaram | G06Q 30/0242 |
| 2019/0108453 | A1* | 4/2019 | Schwabe | G06N 20/00 |
| 2020/0134647 | A1* | 4/2020 | Chahal | G06Q 30/0202 |
| 2021/0019712 | A1* | 1/2021 | Yu | G06Q 10/1093 |
| 2021/0397613 | A1* | 12/2021 | Swint | G06F 16/2457 |
| 2022/0108347 | A1* | 4/2022 | Connell | G06Q 20/3224 |
| 2022/0236902 | A1* | 7/2022 | Pinto | G06F 9/5016 |
| 2022/0321955 | A1* | 10/2022 | Hajiyev | H04N 21/44224 |
| 2023/0136696 | A1* | 5/2023 | Ozcay | G06Q 30/0201 705/7.29 |
| 2024/0126622 | A1* | 4/2024 | Vasudevan | G06F 9/542 |
| 2024/0281410 | A1* | 8/2024 | Williams | G06F 16/122 |
| 2025/0245699 | A1* | 7/2025 | Appiah | G06Q 30/0269 |
| 2025/0247454 | A1* | 7/2025 | Bliner | G06Q 30/0203 |
| 2026/0004371 | A1* | 1/2026 | O'Malley | G06Q 50/184 |

* cited by examiner

SYSTEMS AND METHODS FOR PSYCHOGRAPHIC-DRIVEN MULTICHANNEL PLAN GENERATION AND ORCHESTRATION

TECHNICAL FIELD

The embodiments disclosed herein generally relate to systems and methods for digital marketing automation.

BACKGROUND

Conventional systems for digital marketing automation coordinate customer communications across channels such as email, text messaging, in app notifications, and social platforms. Vendors typically provide customer relationship management databases, audience segmentation tools, journey builders, and message templating engines. Operators define segments using demographic and transactional attributes, schedule campaigns, and configure branching rules that respond to basic events like an open, a click, or a purchase. These platforms connect to external services through application programming interfaces and log delivery metrics for reporting.

Many products aggregate customer data from multiple sources and maintain a profile that includes identifiers, preferences, and historical interactions. They normalize events from web analytics, point of sale systems, contact centers, and messaging providers into a workspace that supports dashboards and list management. They often include template libraries with variable substitution, throttling and frequency caps, and consent management features that align with regulatory requirements. Operators use visual interfaces to compose workflows that determine channel selection, cadence, and eligibility.

Most approaches rely on predefined rules and schedules that operators configure in advance. Systems evaluate conditions at send time, update audience membership periodically, and adjust follow ups based on recent interactions captured as events. Identity resolution typically uses deterministic keys or probabilistic matching to associate events with a profile. Reporting tools summarize outcomes such as opens, clicks, conversions, and unsubscribe events, and they expose this information for downstream analysis.

Existing platforms commonly track the status of messages or tasks within a campaign and allow operators to pause, resume, or modify a running workflow. They surface outcome data to inform future targeting and creative choices and may support automated testing to compare alternative templates. When multiple external systems participate in execution, orchestration services schedule calls to each system and reconcile acknowledgments to maintain a record of activity.

Conventional orchestration platforms relied on static, operator-authored rule sets with fixed schedules and priority queues, so decision logic typically remained unchanged until a manual edit and compute pipelines treated CPU and GPU resources generically without cache-aware data layouts, back-pressure, or device-occupancy controls, which increased redundant network calls and wasted cycles. The disclosed system introduces dynamic vector updates in psychographic analysis and a hardware-aware scheduling kernel that aligns data, overlaps transfer and compute, and applies token-based fairness, producing measurable reductions in CPU load, external API calls, and end-to-end latency as detailed in the description.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended to determine the scope of the claimed subject matter.

In one aspect, embodiments include a data ingestion and normalization module configured to receive interaction data for a contact from multiple external systems and to normalize the data into a common event format. The module writes normalized events to storage and exposes a clean schema that downstream components consume without adapter specific logic.

In one aspect, embodiments provide a customer context memory engine that maintains a Customer Context Record for each contact. The Customer Context Record merges normalized events with behavioral statistics, channel preferences, current status, and a reference to an active plan so that a live profile is available to all decision points.

In one aspect, embodiments include a psychographic analysis engine that derives psychographic dimensions and flags from textual content and behavioral patterns found in the normalized events. The dimensions include relationship orientation, detail orientation, decisiveness, value sensitivity, skepticism, and engagement velocity, and the engine surfaces these values as inputs to plan composition and message selection.

In one aspect, embodiments include a template playbook store that holds operator defined playbooks, templates, tone controls, and parameter policies. The directive plan generation engine consults the playbook store during plan composition so that operator strategies become machine readable rules applied consistently for each contact.

In one aspect, embodiments provide a directive plan generation engine that composes an individualized directive plan for a contact. Each directive specifies a channel identifier, a template style selector, a timing rule, and a cancellation condition, and the engine stores a reference to the plan in the Customer Context Record to mark it as active for execution.

In one aspect, embodiments include an execution orchestration module that reads the active plan and coordinates execution across external platforms. The module performs a pre send cancellation check for a next directive, sets and updates a directive state including pending, sent, skipped, and superseded, and issues application programming interface calls to connected systems in accordance with the channel identifier and timing rule.

In one aspect, embodiments include an application programming interface and messaging integration layer that schedules and executes calls to external services such as customer relationship management platforms and messaging providers. The integration layer records acknowledgments and external identifiers and returns delivery signals to the execution orchestration module.

In one aspect, embodiments include a feedback processing engine that monitors outcomes from external platforms including opens, clicks, replies, bookings, and status changes. The feedback processing engine updates the Customer Context Record with outcome events and evaluates update conditions that may include new outcomes, elapsed time, or contact status transitions.

In one aspect, embodiments regenerate the individualized directive plan upon satisfaction of an update condition. Regeneration replaces or amends the active plan reference in the Customer Context Record so that future directives reflect the latest context and observed outcomes rather than a static journey.

In one aspect, embodiments include an operator web console that presents the Customer Context Record, psychographic dimensions and flags, the individualized directive plan, directive states, and recent interactions. The console accepts operator commands including pause, re plan, and insert directive and translates those commands into structured changes that the execution orchestration module applies to scheduling and delivery.

In one aspect, embodiments provide a user module that authenticates users, controls access to contacts and playbooks and logs administrative actions that modify plans or templates. The user module ensures that plan generation and execution operate within policy and role constraints defined for an organization.

In one aspect, embodiments implement continuous adaptation by combining the customer context memory engine, the directive plan generation engine, the execution orchestration module, and the feedback processing engine in a closed loop. This arrangement applies individualized decision signals to plan composition, executes those plans across heterogeneous systems, and updates the Customer Context Record and plan content in near real time.

In some aspects, the system includes at least one computing device in operable communication with a network and an application server in operable communication with the user network to host an application program for ingesting interaction data, maintaining the Customer Context Record, deriving psychographic attributes, generating individualized directive plans, orchestrating execution across external platforms, and regenerating plans in response to observed outcomes.

In one aspect, embodiments implement multi-tenant namespace isolation with sandboxed execution contexts per-organization and per-contact, a scheduler that applies priority tokens with accrual and decay to load-balance requests and enforce fairness across tenants, and partitioned process queues with per-tenant routing and storage bindings so that workloads execute on distributed nodes while maintaining strict data isolation and horizontal scalability.

Other illustrative variations within the scope of the disclosed subject matter will become apparent from the detailed description provided hereinafter. The detailed description and enumerated variations, while disclosing optional variations, are intended for purposes of illustration only and are not intended to limit the scope of the claimed subject matter.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
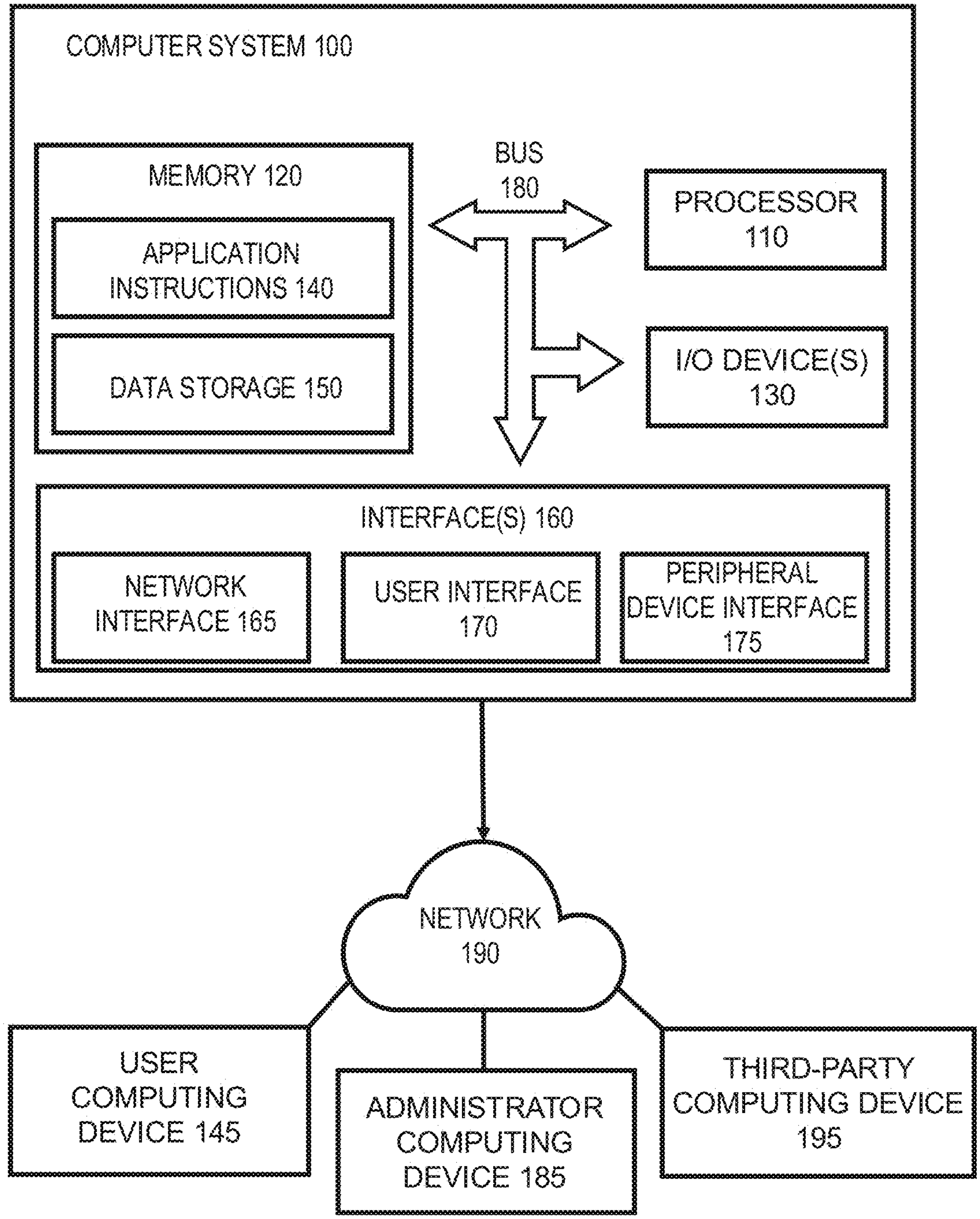
FIG. 1 illustrates a block diagram of the computing system infrastructure, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom.

Before describing exemplary embodiments in detail, it is noted that the embodiments reside primarily in combinations of components related to devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The disclosed system may include one or more computing devices having a processor, a memory, non-transitory storage, and network interfaces that host interoperating software modules. A data ingestion and normalization module may receive interaction data from external platforms and convert the data into a common event schema. A customer context memory engine may maintain, for each contact, a Customer Context Record that stores normalized events, behavioral statistics, channel preferences, current status, and a reference to an active plan. A psychographic analysis engine may execute natural language processing and behavioral modeling to compute psychographic dimensions and flags from message content and interaction patterns. A directive plan generation engine may synthesize an individualized directive plan comprising directives with channel identifiers, template style selectors, timing rules, and cancellation conditions, optionally guided by a template playbook store. An execution orchestration module may coordinate calls to external platforms through an integration layer and track a directive state. A feedback processing engine may monitor outcome signals and update the Customer Context Record in response to those signals.

Many operators describe a practical problem in digital marketing automation as stitching together fragmented signals, deciding what to say next, and executing across channels without manual scripting for each audience branch. The disclosed system addresses this problem by maintaining a continuously updated Customer Context Record and applying psychographic analysis to produce control signals that guide plan synthesis. In response to new events, the system may generate or adjust an individualized directive plan, enforce cancellation conditions, and orchestrate delivery through connected platforms while tracking directive state. This arrangement provides individualized, context aware decisions and coordinated execution in a single workflow that operates on a normalized schema and a unified context.

In practice and in use, the system may be utilized in cases where a business communicates with prospective or existing customers across email, text messaging, and customer relationship management tasks. For example, when a contact replies to an email, the data ingestion and normalization module may create a normalized event, the psychographic analysis engine may update decisiveness and detail orientation from the reply text, and the directive plan generation engine may produce a next step that selects a concise template, assigns a channel identifier for text messaging, and sets a timing rule. The execution orchestration module may call external services to schedule or send the message and store a state for the directive, while the feedback processing engine may record opens, clicks, or bookings as outcomes that update the Customer Context Record.

In this way, the system may improve practical operation by reducing operator authored rule trees, lowering redundant network calls through pre send cancellation checks, and decreasing compute and memory overhead by using a normalized event schema and a single Customer Context Record per contact as a shared cache. Psychographic control signals may increase message relevance without expanding the number of workflows an operator must maintain. Closed loop adaptation may reduce latency between observation and response, which can improve throughput on the hosting hardware by avoiding long running batch recomputations and by concentrating processing on contacts with actionable updates.

Various implementations of the disclosed system involve the technical field of digital marketing automation including receiving interaction data from multiple external systems over a network, normalizing the interaction data into a common event format using programmatic parsers, maintaining a Customer Context Record in computer memory as a unified data structure, deriving psychographic dimensions and flags using machine learning models that execute natural language processing on message content and behavioral time series, generating an individualized directive plan by algorithmically selecting a channel identifier, a template style selector, a timing rule, and a cancellation condition for each directive, orchestrating execution by issuing application programming interface calls to external platforms while tracking a directive state in persistent storage, monitoring outcomes received from remote services, and regenerating the individualized directive plan in response to those outcomes. These steps are inherently computer based and cannot be performed in the human mind due to the required network communication, concurrent state management, large scale text and behavior modeling, and automated cross platform scheduling. The disclosed subject matter amounts to more than merely using a generic computer as a tool to gather, analyze, and output data because the specific modules and data structures improve digital marketing automation by transforming heterogeneous event streams into a normalized schema, by computing psychographic control signals that drive per contact plan synthesis, and by coordinating real time execution with cancellation enforcement that reduces unnecessary network calls and compute cycles. The operations would be impossible to accomplish on pen and paper given the continuous volumes of events communicated over the network and the low latency adaptation required to update plans in response to outcomes. In particular, the speed and concurrency at which these steps occur involve large scale, continuous communication with external services and machine inference over high dimensional data, which cannot be accomplished as a method of organizing human activity and amount to significantly more than merely gathering, analyzing, and outputting data.

Implementations of the disclosed system include implementing one or more artificial intelligence models on a computing device wherein the computing device executes the models' algorithms and mathematical functions on computer hardware using machine learning libraries. The computing device implements the models when it performs tasks such as training, making predictions, applying the models to normalized interaction data, decision making, classification, and generating control signals that drive plan composition. In some embodiments, a transformer based natural language processing model encodes message content to infer psychographic dimensions and flags, a time series model scores engagement velocity from event streams, and a policy model selects a channel identifier, a template style selector, a timing rule, and a cancellation condition for each directive. The computing device performs batched or streaming inference over high dimensional feature vectors, persists embeddings and scores within the Customer Context Record, and updates model parameters during periodic retraining using outcome labels such as opens, clicks, replies, bookings, and status changes.

The speed at which these artificial intelligence models analyze and transform data to effectuate the disclosed method, system, or product involves large scale, continuous transformation of network sourced events and text. These operations cannot be performed in the human mind or on pen and paper due to the data volumes, the dimensionality of the learned representations, the concurrency of inputs from multiple external platforms, and the low latency requirements for updating individualized directive plans in response to outcomes. The disclosed subject matter amounts to more than merely using a generic computer to gather, analyze, and output data because the integrated models produce psychographic control signals and policy decisions that restructure downstream computation, reduce redundant network calls through cancellation enforcement, and concentrate processing on contacts with actionable updates, thereby improving digital marketing automation as a technical field.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computer system 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 140, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include, for example, RAM, which can act as external cache memory. The memory and/or memory components of the systems or computer-implemented methods can include the foregoing or other suitable types of memory.

Generally, a computing device will also include or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The user computing device 145 may be utilized by a user to interact with the various functionalities of the system. The administrator computing device 185 is utilized by an administrative user to moderate content and to perform other administrative functions. The third-party computing device 195 may be utilized by third parties to receive communications from the user computing device, transmit communications to the user via the network, and otherwise interact with the various functionalities of the system.

Figure 2:
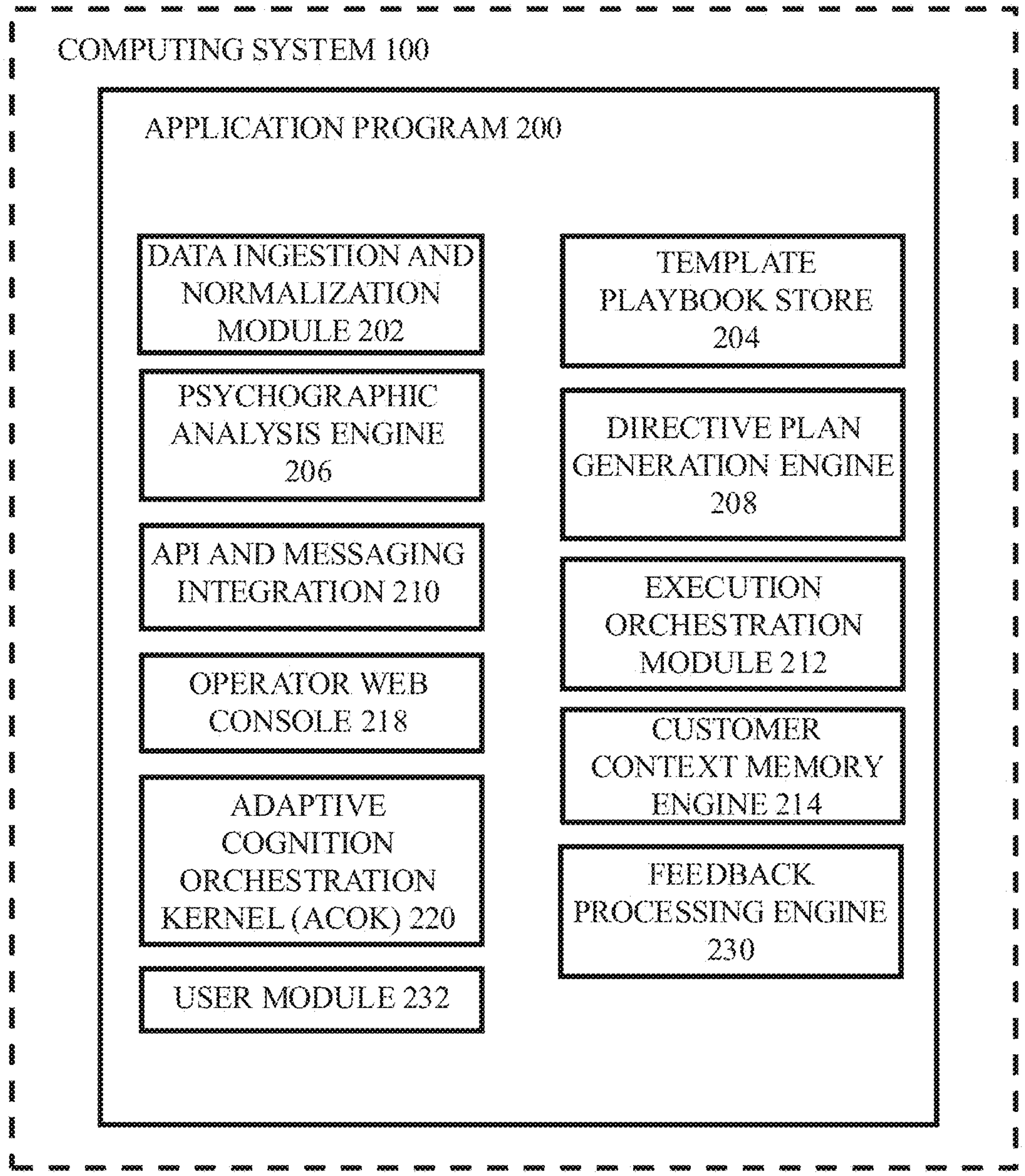
FIG. 2 illustrates an application program and modules in communication with the computing system, according to some embodiments.

FIG. 2 illustrates an application program 200 executing on the computing system 100 of FIG. 1. The application program 200 comprises interoperating software components that run on processor 110 of FIG. 1, maintain working state in memory 120 of FIG. 1, persist records in data storage 150 of FIG. 1, and exchange messages with external platforms through network interface 165 of FIG. 1. Each labeled element in FIG. 2 is described with what the element is, what the element does, and how the element performs those functions.

The application program 200 of FIG. 2 operates in a multi-tenant namespace in which each resource, message, and persisted record carries a tenant-identifier and optional sub-tenant scope. User module 232 of FIG. 2 issues scoped credentials that encode tenant claims, and customer context memory engine 214 of FIG. 2 mounts tenant-scoped schemas in data storage 150 of FIG. 1 so reads and writes resolve only per-tenant paths. Execution orchestration module 212 of FIG. 2 and API and messaging integration 210 of FIG. 2 create sandboxed execution contexts per-organization and per-contact by loading tenant configuration, restricting network egress to provider endpoints registered for that tenant, sealing environment variables, and writing audit entries for every cross-component call. These constraints permit operators to host multiple organizations on shared hardware while maintaining namespace boundaries at the data-access layer and at runtime.

Adaptive cognitive orchestration kernel (ACOK) 220 of FIG. 2 applies load-balancing and fairness using priority tokens. ACOK 220 maintains token buckets per-tenant, per-channel, and per-provider with accrual rates derived from configured service-level objectives and decay proportional to recent consumption measured from directive dispatches recorded by execution orchestration module 212 of FIG. 2. ACOK 220 debits tokens when admitting a work item to a run queue, applies back-pressure when a bucket drops below a threshold, defers low-priority items, and elevates under-served tenants by increasing effective priority when positive token balance persists. These mechanisms select the next work item from a priority queue while enforcing rate limits and preventing starvation across tenants during bursty workloads.

Process queues are partitioned per-tenant to support distributed deployments. Execution orchestration module 212 of FIG. 2 derives a partition key from the tenant-identifier and directive class and enqueues work into per-tenant partitions stored in data storage 150 of FIG. 1. ACOK 220 of FIG. 2 routes partitions to worker nodes using consistent hashing and migrates assignments when nodes join or leave, while maintaining in-flight acknowledgments to avoid duplicate sends through API and messaging integration 210 of FIG. 2. Customer context memory engine 214 of FIG. 2 binds each partition to tenant-scoped databases or schemas and applies per-tenant encryption keys so cross-partition reads are rejected at the data-access layer. This arrangement permits horizontal scaling across nodes while maintaining strict per-tenant data isolation and predictable throughput.

The data ingestion and normalization module 202 is executable software that receives interaction data from external systems and transforms the interaction data to a canonical schema tied to a contact. The data ingestion and normalization module 202 exposes authenticated HTTPS endpoints and message-broker consumers on network interface 165 of FIG. 1, verifies request signatures, parses provider payloads with source-specific adapters, and maps provider fields to canonical attributes including contact key, event type, timestamp, channel, payload hash, and provider identifier. The data ingestion and normalization module 202 computes a payload hash for deduplication within a sliding time window, resolves a contact key by querying the customer context memory engine 214, and writes a normalized event to a durable queue in data storage 150 of FIG. 1 while returning a stable event identifier for downstream reference.

In some embodiments, the data ingestion and normalization module 202 performs probabilistic identity resolution when a deterministic identifier is unavailable by computing similarity over hashed emails, device identifiers, and session metadata, and the data ingestion and normalization module 202 writes a confidence score that downstream merge logic honors. In some embodiments, the data ingestion and normalization module 202 operates as a streaming pipeline that negotiates schema versions, so adapters continue to function when a provider changes a payload format.

The customer context memory engine 214 is executable software that maintains a Customer Context Record for each contact as a unified data structure. The customer context memory engine 214 stores the Customer Context Record in data storage 150 of FIG. 1 and caches frequently accessed fields in memory 120 of FIG. 1 to serve low-latency reads for execution. The customer context memory engine 214 merges normalized events, behavioral statistics, channel preferences, current status, and a reference to an active plan by applying deterministic reducers that accept the prior snapshot and a new event. The customer context memory engine 214 publishes change notifications over network interface 165 of FIG. 1 so dependent components subscribe to updates without polling.

In some embodiments, the customer context memory engine 214 represents the Customer Context Record as a document with sub-documents for psychographic dimensions, directive states, plan metadata, and outcome history. In some embodiments, the customer context memory engine 214 represents the Customer Context Record in a relational schema using tables for contacts, plans, directives, events, and outcomes linked by foreign keys and enforces referential integrity to prevent orphaned directives. In some embodiments, the customer context memory engine 214 encrypts selected fields at rest and integrates with the user module 232 for field-level access control.

The psychographic analysis engine 206 is executable software that derives psychographic dimensions and flags from textual content and behavioral patterns. The psychographic analysis engine 206 reads message bodies and metadata from normalized events, tokenizes the text, computes embeddings using a transformer language model loaded from data storage 150 of FIG. 1, and extracts behavior features such as reply latency, open-to-click ratios, and decay-weighted activity counts by scanning event sequences. The psychographic analysis engine 206 fuses embeddings and behavior features in a trained classifier to produce scores for relationship orientation, detail orientation, decisiveness, value sensitivity, skepticism, and engagement velocity, and the psychographic analysis engine 206 writes the scores and flags to the Customer Context Record through the customer context memory engine 214.

The psychographic analysis engine 206 of FIG. 2 computes a psychographic vector delta ΔV for a contact by evaluating $\Delta V=(w_i \times b_i)-V_o$, where $w_i$ are learned weights stored in an aligned weight matrix and $b_i$ are behavior features retrieved from the Customer Context Record via the customer context memory engine 214 of FIG. 2. The psychographic analysis engine 206 arranges the weight matrix and the behavior feature arrays in contiguous, cache-line-aligned memory and pads dimensions to a multiple of the processor vector width so processor 110 of FIG. 1 executes fused-multiply-accumulate operations with fewer cache misses and reduced memory latency. The psychographic analysis engine 206 writes the resulting ΔV back to the Customer Context Record as a compact float vector with an associated version and timestamp.

The psychographic analysis engine 206 executes the ΔV computation inside a scheduling kernel that uses asynchronous event queues and shared buffers across CPU and GPU compute units. The scheduling kernel allocates page-locked host buffers for the behavior feature arrays, stages the aligned weight matrix into device memory, and launches concurrent work on multiple streams so feature transfer and matrix multiplication overlap. Shared buffers hold intermediate tiles of the behavior features and ΔV, and the scheduling kernel signals completion through the event queues so the directive plan generation engine 208 can consume updated psychographic dimensions without polling.

These arrangements provide quantifiable structural efficiencies in the claimed system. The aligned data layouts reduce cache evictions on processor 110 of FIG. 1, the fused-multiply-accumulate paths shorten memory-bound stalls, and the asynchronous event queues with shared CPU and GPU buffers hide transfer latency. As a result, the ΔV computation completes with lower end-to-end latency and reduced host CPU utilization, which represents a specific technical improvement in computing performance rather than a conceptual or business rule mechanism.

In some embodiments, a psychographic vector V maintained by the psychographic analysis engine 206 resides as an N×M floating-point array in GPU or other accelerator memory and is updated asynchronously in real time. The psychographic analysis engine 206 stores V in a row-major, structure-of-arrays layout with cache-line-aligned strides, maintains a page-locked host mirror in memory 120 of FIG. 1, and transfers tiles via direct memory access over bus 180 of FIG. 1 to the device. Each normalized event triggers a ΔV write to V together with a version and timestamp.

In some embodiments, the psychographic analysis engine 206 enforces an update interval of less than 20 milliseconds per trigger event measured from event persistence to ΔV commit, using a multi-threaded scheduling kernel on processor 110 of FIG. 1 with a thread pool, lock-free ring buffers, and multiple GPU streams. The scheduling kernel applies back-pressure when device queues exceed a threshold and resumes when shared buffers drain.

In some embodiments, the disclosed system employs explicit hardware interfaces as structural components: processor clusters with vector units on processor 110 of FIG. 1, memory buffers in memory 120 of FIG. 1 and device memory on the accelerator, network transports provided by network interface 165 of FIG. 1 for TLS-secured messaging, and bus infrastructure such as PCIe represented by bus 180 of FIG. 1 for host-to-device transfers. These implementations illustrate concrete processing structures on which the described operations run.

In some embodiments, the psychographic analysis engine 206 executes a ruleset when a model confidence score falls below a threshold or when the deployment targets a resource-constrained device, and the psychographic analysis engine 206 annotates the Customer Context Record with the rule that produced the value. In some embodiments, the psychographic analysis engine 206 performs on-device inference to preserve privacy and synchronizes only aggregate scores and model-version identifiers.

The template playbook store 204 is a managed repository of operator-authored assets and policies that guide composition. The template playbook store 204 stores templates tagged by channel, tone, and compliance attributes, stores parameter policies such as frequency caps and quiet hours, and stores selection rules that map psychographic dimensions to template style selectors. The template playbook store 204 exposes a versioned, read-only interface to the directive plan generation engine 208 and returns template identifiers and parameter sets given a plan context that includes psychographic dimensions, status, and channel preferences.

In some embodiments, the template playbook store 204 implements tenant-level namespacing and inheritance so a team-level library extends an organization baseline while preserving overrides. In some embodiments, the template playbook store 204 validates placeholders against fields available in the Customer Context Record to prevent runtime render errors.

The directive plan generation engine 208 is executable software that composes an individualized directive plan for a contact. The directive plan generation engine 208 reads the Customer Context Record from the customer context memory engine 214, consults the template playbook store 204, and applies selection logic informed by outputs of the psychographic analysis engine 206. The directive plan generation engine 208 creates directives that each include a channel identifier, a template style selector, a timing rule, and a cancellation condition expressed as predicates over events and context fields. The directive plan generation engine 208 stores the individualized directive plan in data storage 150 of FIG. 1 and writes a reference to the individualized directive plan into the Customer Context Record as an active plan for execution.

In some embodiments, the directive plan generation engine 208 computes a rolling horizon of directives and performs partial re-optimization when the customer context memory engine 214 publishes a change notification that exceeds a configured significance threshold. In some embodiments, the directive plan generation engine 208 uses a policy model that proposes channels and message styles, and the directive plan generation engine 208 enforces constraints from the template playbook store 204, including quiet hours and jurisdictional exclusions, before emitting a directive.

The execution orchestration module 212 is executable software that coordinates multi-channel delivery using the active plan. The execution orchestration module 212 reads the active plan via the customer context memory engine 214, evaluates each next directive's cancellation condition in response to new events and immediately prior to scheduling, and selects an execution slot that satisfies the timing rule and external throughput constraints. The execution orchestration module 212 issues platform requests through the API and messaging integration 210, records external identifiers, and persists directive-state transitions of pending, sent, skipped, and superseded back to the Customer Context Record through the customer context memory engine 214.

In some embodiments, the execution orchestration module 212 employs a priority queue across contacts to respect organization-level frequency caps and applies a transactional outbox pattern stored in data storage 150 of FIG. 1 that writes a platform request and a directive-state transition atomically to prevent duplicate sends during retries. In some embodiments, the execution orchestration module 212 batches homogeneous requests to reduce network round-trips and applies per-channel rate-limiters.

Representative results from benchmark simulations or prototypes on computing system 100 of FIG. 1 indicate that the disclosed system reduces compute and I/O overhead relative to a reference system that lacks cancellation condition enforcement before send, lacks the ΔV scheduling kernel in the psychographic analysis engine 206, and uses non-aligned data layouts. Under an identical mixed workload, average CPU load decreased from 74 percent to 48 percent, API calls per cycle decreased from 320 to 210, and median end-to-end latency from receipt of a normalized event to storage of an updated individualized directive plan decreased from 38 milliseconds to 22 milliseconds. These values are illustrative and may vary by hardware, dataset, and configuration.

The observed reductions are attributable to technical mechanisms disclosed herein. Execution orchestration module 212 enforces the cancellation condition before issuing provider calls through API and messaging integration 210, which removes unnecessary network traffic; the psychographic analysis engine 206 performs the ΔV computation using cache-aligned arrays, fused-multiply-accumulate operations on processor 110 of FIG. 1, and asynchronous event queues with shared buffers across CPU and GPU units; and customer context memory engine 214 provides batched, aligned reads that avoid reformatting. Together with directive plan generation engine 208 producing a compact next action set, these mechanisms account for the CPU usage drop, the reduction in API calls per cycle, and the latency improvement.

A compute efficiency index CEI may be used as a representative quantitative measurement of orchestration performance, where CEI=(Q×A)/C. In one arrangement, Q represents response quality metrics derived from outcome rates and engagement lift recorded in the Customer Context Record by feedback processing engine 230 of FIG. 2, A represents adaptive processing accuracy measured from agreement between regenerated individualized directive plans and observed outcomes, and C represents cumulative CPU cycles obtained from hardware performance counters on processor 110 of FIG. 1 during psychographic analysis engine 206 and execution orchestration module 212 activity. CEI may be computed per contact over a rolling window and aggregated across contacts to characterize end to end efficiency during mixed workloads.

CEI is provided as an explanatory construct and not as a claim limitation. For the representative workload in [0074], CEI increased when Q and A rose while C decreased due to cancellation enforcement, cache aligned ΔV computation, and asynchronous CPU and GPU buffering described in [0075]. In some embodiments, CEI is reported at fixed intervals, for example every second, using sampling of hardware counters and outcome logs; in other embodiments, CEI is computed on demand for a selected cohort using the same underlying measurements.

The API and messaging integration 210 is executable software that translates directives into provider-specific requests and manages provider I/O. The API and messaging integration 210 maps directive fields to provider payloads, signs requests using credentials issued by the user module 232, transmits the requests via network interface 165 of FIG. 1, verifies provider acknowledgments, and records response codes and external message identifiers. The API and messaging integration 210 exposes webhook endpoints for outcomes and validates signatures before accepting callbacks, and the API and messaging integration 210 places unrecognized or malformed callbacks into a quarantine queue for inspection.

In some embodiments, the API and messaging integration 210 provides a sandbox mode that validates payload structure and authorization without sending live traffic and returns simulated acknowledgments for test and staging flows. In some embodiments, the API and messaging integration 210 installs on-premises connectors where outbound calls traverse a controlled gateway and the connector writes audit logs to data storage 150 of FIG. 1 for compliance.

The feedback processing engine 230 is executable software that ingests outcomes and triggers adaptation. The feedback processing engine 230 collects opens, clicks, replies, bookings, and status changes from webhook callbacks handled by the API and messaging integration 210 and from periodic provider log pulls. The feedback processing engine 230 converts raw outcomes to the canonical event schema used by the data ingestion and normalization module 202, updates the Customer Context Record via the customer context memory engine 214, and evaluates update conditions that compare new outcomes and current status to thresholds. The feedback processing engine 230 invokes the directive plan generation engine 208 to regenerate an individualized directive plan when an update condition is satisfied.

In some embodiments, the feedback processing engine 230 computes derived metrics such as decay-weighted engagement scores and channel-specific responsiveness and writes those metrics to the Customer Context Record so the directive plan generation engine 208 and the psychographic analysis engine 206 consume the metrics directly. In some embodiments, the feedback processing engine 230 applies precedence rules configured in the template playbook store 204 to resolve conflicts among outcomes, for example, honoring do-not-contact state over lower-priority clicks.

The operator web console 218 is a user-facing application that surfaces the Customer Context Record and controls execution. The operator web console 218 retrieves the Customer Context Record from the customer context memory engine 214, renders psychographic dimensions and flags produced by the psychographic analysis engine 206, displays the individualized directive plan generated by the directive plan generation engine 208, and shows directive states maintained by the execution orchestration module 212. The operator web console 218 accepts operator commands such as pause, re-plan, and insert directive and submits structured requests containing contact identifiers, reason codes, and authenticated operator credentials to the directive plan generation engine 208 and the execution orchestration module 212.

In some embodiments, the operator web console 218 presents model-version and playbook-version metadata to support auditability, and the operator web console 218 provides a simulation panel that calls a dry-run endpoint on the directive plan generation engine 208 to preview prospective changes without writing to the Customer Context Record.

The user module 232 is executable software that authenticates operators and service accounts and enforces permissions. The user module 232 integrates with identity providers, issues scoped tokens, stores organization membership and role assignments in data storage 150 of FIG. 1, and supplies credentials to the API and messaging integration 210 for outbound calls. The user module 232 logs administrative actions, including template edits in the template playbook store 204 and manual directive insertions through the operator web console 218, and exposes those logs via network interface 165 of FIG. 1 for audit review.

In some embodiments, the user module 232 performs just-in-time user provisioning and enforces data-residency policies by routing storage and compute requests originating from the customer context memory engine 214 and the feedback processing engine 230 to region-specific resources.

The application program 200 as shown in FIG. 2 operates as a closed-loop arrangement. The data ingestion and normalization module 202 produces normalized events, the customer context memory engine 214 merges those events into the Customer Context Record, the psychographic analysis engine 206 derives control signals, the directive plan generation engine 208 composes an individualized directive plan guided by assets in the template playbook store 204, the execution orchestration module 212 delivers directives through the API and messaging integration 210, and the feedback processing engine 230 writes outcomes that may satisfy update conditions and trigger regeneration.

An adaptive cognitive orchestration kernel (ACOK) 220 configured to coordinate directive generation, dynamic behavioral weighting, and psychographic delta updates across distributed compute elements operates within application program 200. ACOK 220 receives change notifications from customer context memory engine 214, schedules psychographic analysis engine 206 ΔV updates, invokes directive plan generation engine 208, and sequences execution orchestration module 212 actions while sharing state through memory 120 of FIG. 1 and device memory on attached accelerators over bus 180 of FIG. 1.

In some embodiments, ACOK 220 executes across multiple processing threads on processor 110 of FIG. 1 using a thread pool, lock-free queues, and compare and swap guarded state transitions. ACOK 220 assigns work items for ΔV computation, plan regeneration, and pre send cancellation evaluation to worker threads and aggregates results through shared buffers to reduce latency.

In some embodiments, ACOK 220 applies token based fairness and load balancing by maintaining token buckets per tenant, channel, and provider. ACOK 220 replenishes tokens at configured rates, routes work to CPU or GPU compute units based on queue depth and device occupancy and defers non urgent items when a bucket is exhausted to avoid resource starvation.

In some embodiments, ACOK 220 enforces event priority rules and multi-tenant scheduling by ranking work items with a weighted priority that considers update condition triggers, outcome types, and service level objectives. ACOK 220 maintains per tenant quotas, limits cross tenant interference, and selects the next work item from a priority queue that respects both quotas and per channel throughput constraints.

In some embodiments, ACOK 220 manages a directive plan object lifecycle with states create, activate, modify, supersede, and archive. ACOK 220 assigns a version and timestamp at create, marks activate when execution orchestration module 212 reads the individualized directive plan, records modify when operator commands adjust content via operator facing console 218, marks supersede when directive plan generation engine 208 writes a replacement and moves the prior version to archive after all remaining unsent directives record a superseded state in the Customer Context Record.

In a microservice and API traffic management embodiment, application program 200 of FIG. 2 treats a service, an endpoint, or a queue as the entity and stores a context record for that entity in customer context memory engine 214 with a machine-interpretable vector that may include recent p95 latency, error rate, queue depth, retry count, and cache hit ratio. ACOK 220 deltas on those metrics, evaluates thresholds and stability scores, and when a threshold is crossed directs directive plan generation engine 208 to select a plan that may include actions such as adjust rate limits, shift traffic to a healthy replica, open a circuit breaker, scale out a deployment, or change retry backoff. Execution orchestration module 212 schedules and dispatches those directives to execution endpoints such as a service mesh controller or an autoscaler through API and messaging integration 210. The feedback processing engine 230 writes outcomes such as updated latency and error rates back to the context record so ACOK 220 may converge toward lower retry counts, reduced p95 latency, and fewer saturated queues.

In a fraud, risk, or incident response embodiment, application program 200 treats a user account, session, device, or service segment as the entity and stores a context record in customer context memory engine 214 with a vector that may include anomaly scores, login velocity, geodiversity, payment risk flags, and intrusion detection alerts together with confidence and stability fields. ACOK 220 computes metric deltas, applies policy thresholds, and when triggered directs directive plan generation engine 208 to select actions such as step-up authentication, token revocation, transaction hold, service segment isolation, or evidence capture. Execution orchestration module 212 dispatches those directives to downstream systems including identity providers, payment gateways, and network controllers through API and messaging integration 210, while the feedback processing engine 230 records containment time, false positive annotations, and subsequent alert rates so ACOK 220 may schedule fewer intrusive actions when stability improves and may shorten mean time to containment when risk rises.

In a customer-support routing and escalation embodiment, application program 200 treats a ticket or case as the entity and stores a context record in customer context memory engine 214 with a vector that may include SLA age, sentiment score, product area, prior contact count, and resolver workload. ACOK 220 computes deltas on those features, evaluates thresholds tied to SLA targets, and directs directive plan generation engine 208 to select actions such as assign to a skilled queue, escalate to an on-call role, request diagnostic logs, or trigger a knowledge-article response. Execution orchestration module 212 of FIG. 2 schedules those directives to execution endpoints in an IT service management platform via API and messaging integration 210, and the feedback processing engine 230 writes resolution time, re-open rate, and handoff count back to the context record so ACOK 220 may adapt batching and priority to reduce SLA breaches and median time to first response.

In an IoT or device orchestration embodiment, application program 200 treats a device as the entity and stores a context record in customer context memory engine 214 with a vector that may include battery level, radio signal quality, packet loss, firmware version, sensor variance, and duty-cycle history. ACOK 220 computes deltas, checks thresholds that reflect device health and connectivity stability, and directs directive plan generation engine 208 to select actions such as stage a firmware update, shift radio profiles, reduce sampling rate, rotate credentials, or switch an ingest endpoint. Execution orchestration module 212 partitions work per-tenant and per-device class and dispatches directives to device managers through API and messaging integration 210; the feedback processing engine 230 records rollout success, reconnect time, and energy usage so ACOK 220 may schedule staggered updates and adjust batching to lower peak network load while maintaining target availability.

Figure 3:
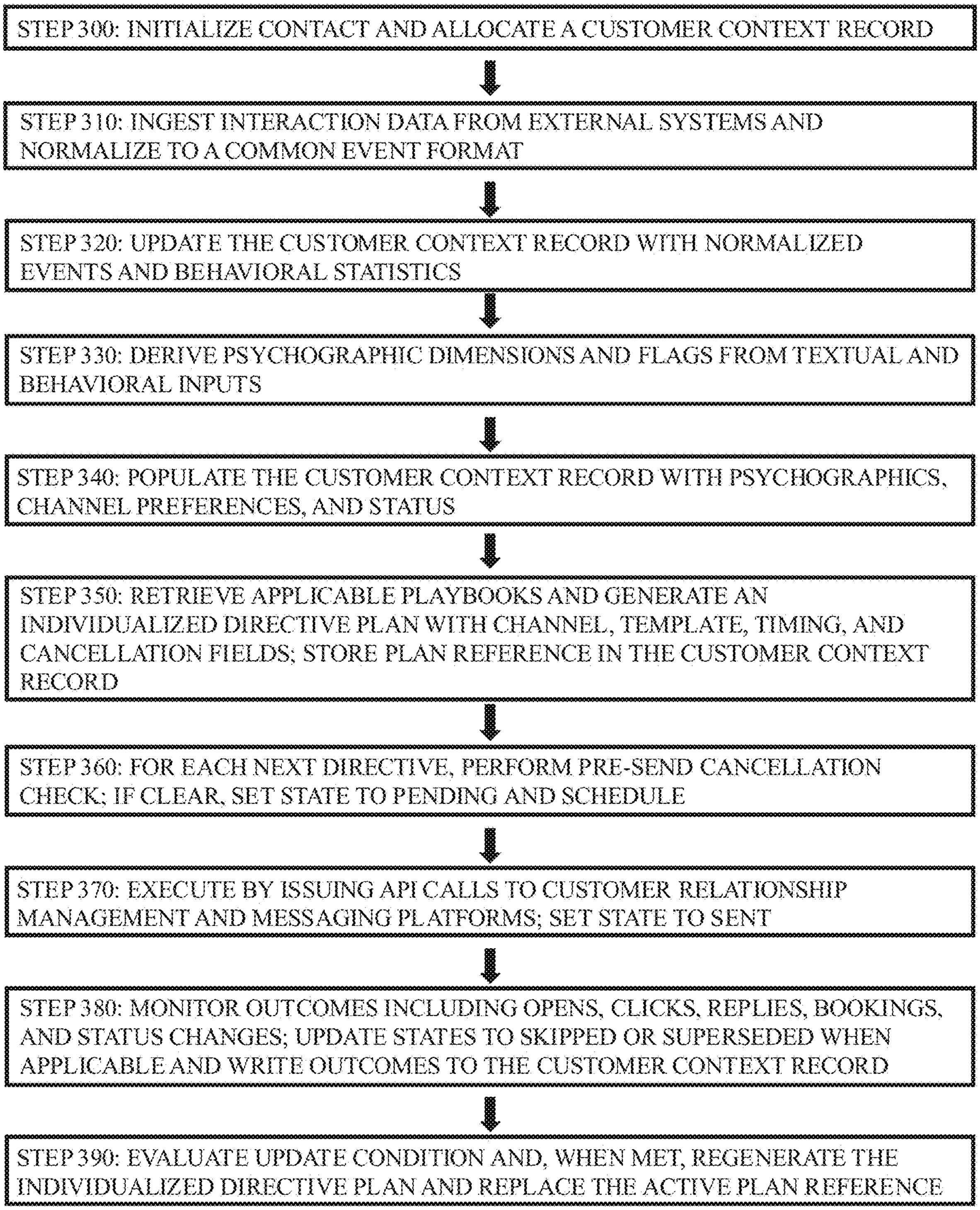
FIG. 3 illustrates a workflow of the disclosed system from ingesting interaction data and updating customer context through plan creation and execution readiness.

FIG. 3 illustrates a workflow executed by application program 200 of FIG. 2 on computing system 100 of FIG. 1. Processor 110 of FIG. 1 executes application instructions 140 of FIG. 1 that implement data ingestion and normalization module 202 of FIG. 2, psychographic analysis engine 206 of FIG. 2, template playbook store 204 of FIG. 2, directive plan generation engine 208 of FIG. 2, execution orchestration module 212 of FIG. 2, API and messaging integration 210 of FIG. 2, customer context memory engine 214 of FIG. 2, operator web console 218 of FIG. 2, user module 232 of FIG. 2, and feedback processing engine 230 of FIG. 2 to perform Steps 300 through 390.

Step 300 initializes a contact and allocates a Customer Context Record in data storage 150 of FIG. 1 by invoking customer context memory engine 214 of FIG. 2. Customer context memory engine 214 of FIG. 2 creates a record keyed by a contact identifier, allocates sections for events, psychographic dimensions, channel preferences, status, directive states, and plan metadata, persists the record in data storage 150 of FIG. 1, and places a cache entry in memory 120 of FIG. 1 for low latency access. Customer context memory engine 214 of FIG. 2 returns a handle for atomic reads and writes.

In some embodiments, customer context memory engine 214 of FIG. 2 seeds the Customer Context Record with jurisdiction and consent flags and stores a region pointer so subsequent writes route to a residency compliant shard.

Step 310 ingests interaction data from external systems through network interface 165 of FIG. 1 using data ingestion and normalization module 202 of FIG. 2. Data ingestion and normalization module 202 of FIG. 2 receives provider payloads on authenticated HTTPS endpoints or message broker topics, verifies signatures, parses payloads with source adapters, maps fields to a canonical event schema, computes a payload hash for deduplication, resolves a contact identifier by querying customer context memory engine 214 of FIG. 2, and emits a normalized event object to a durable queue in data storage 150 of FIG. 1 while returning a stable event identifier.

Step 320 updates the Customer Context Record with normalized events and behavioral statistics using customer context memory engine 214 of FIG. 2. Customer context memory engine 214 of FIG. 2 executes an event reducer that merges the normalized event, sets last seen channel and timestamps, increments counters, refreshes rolling metrics, writes a provenance link to the normalized event in data storage 150 of FIG. 1, and publishes a change notification over network interface 165 of FIG. 1 to subscribed modules.

Step 330 derives psychographic dimensions and flags from textual and behavioral inputs using psychographic analysis engine 206 of FIG. 2. Psychographic analysis engine 206 of FIG. 2 loads message text and metadata referenced by the normalized event, tokenizes text, generates embeddings with a transformer model stored in data storage 150 of FIG. 1, aggregates behavior features from the Customer Context Record retrieved through customer context memory engine 214 of FIG. 2, fuses embeddings and features in a classifier, and writes scores and flags for relationship orientation, detail orientation, decisiveness, value sensitivity, skepticism, and engagement velocity back to the Customer Context Record through customer context memory engine 214 of FIG. 2.

In some embodiments, psychographic analysis engine 206 of FIG. 2 executes a fallback ruleset when a model confidence threshold is not met and annotates the Customer Context Record with a ruleset identifier and contributing features.

Step 340 populates the Customer Context Record with psychographic dimensions, channel preferences, and status via customer context memory engine 214 of FIG. 2. Customer context memory engine 214 of FIG. 2 commits an atomic upsert of the psychographic sub document, stamps a version and timestamp, encrypts designated fields prior to persistence in data storage 150 of FIG. 1, and exposes the updated snapshot to downstream readers over network interface 165 of FIG. 1.

Step 350 retrieves applicable playbooks from template playbook store 204 of FIG. 2 and generates an individualized directive plan using directive plan generation engine 208 of FIG. 2. Directive plan generation engine 208 of FIG. 2 evaluates selection rules using psychographic values and status read from the Customer Context Record via customer context memory engine 214 of FIG. 2, assembles directives each having a channel identifier, a template style selector, a timing rule, and a cancellation condition, writes the individualized directive plan to data storage 150 of FIG. 1, and stores a reference to the individualized directive plan in the Customer Context Record through customer context memory engine 214 of FIG. 2.

In some embodiments, directive plan generation engine 208 of FIG. 2 computes a rolling horizon of directives and marks older directives as superseded when a replacement plan is written. In some embodiments, template playbook store 204 of FIG. 2 returns jurisdiction aware parameters such as quiet hours that directive plan generation engine 208 of FIG. 2 embeds into timing rules.

Step 360 performs a pre send cancellation check for a next directive using execution orchestration module 212 of FIG. 2. Execution orchestration module 212 of FIG. 2 evaluates the directive's cancellation condition as predicates over fields in the current Customer Context Record from customer context memory engine 214 of FIG. 2 and against normalized events newly written by data ingestion and normalization module 202 of FIG. 2. When the condition evaluates to false, execution orchestration module 212 of FIG. 2 sets the directive state to pending in the Customer Context Record and places a scheduled job into an execution queue sized to platform throughput limits tracked by API and messaging integration 210 of FIG. 2.

Step 370 executes the pending directive through API and messaging integration 210 of FIG. 2. API and messaging integration 210 of FIG. 2 maps directive fields to provider payloads, signs requests using credentials issued by user module 232 of FIG. 2, transmits requests via network interface 165 of FIG. 1, receives provider acknowledgments, records external message identifiers and response codes in data storage 150 of FIG. 1, and notifies execution orchestration module 212 of FIG. 2. Execution orchestration module 212 of FIG. 2 writes the directive state of sent to the Customer Context Record via customer context memory engine 214 of FIG. 2. In some embodiments, API and messaging integration 210 of FIG. 2 uses a transactional outbox so the platform request and the state transition are persisted atomically to prevent duplicates during retries.

Step 380 monitors outcomes using feedback processing engine 230 of FIG. 2. Feedback processing engine 230 of FIG. 2 accepts webhook callbacks exposed by API and messaging integration 210 of FIG. 2, validates signatures, normalizes outcomes to the canonical event schema used by data ingestion and normalization module 202 of FIG. 2, correlates outcomes to external message identifiers stored in data storage 150 of FIG. 1, and writes outcome events and any directive state transitions of skipped or superseded to the Customer Context Record through customer context memory engine 214 of FIG. 2.

Step 390 evaluates an update condition and regenerates the individualized directive plan when satisfied. Feedback processing engine 230 of FIG. 2 computes update condition predicates using newly written outcomes and the current status in the Customer Context Record retrieved from customer context memory engine 214 of FIG. 2 and issues a regeneration request with a reason code to directive plan generation engine 208 of FIG. 2. Directive plan generation engine 208 of FIG. 2 reads the current Customer Context Record, consults template playbook store 204 of FIG. 2, composes a replacement plan, writes the replacement plan to data storage 150 of FIG. 1, updates the active plan reference in the Customer Context Record via customer context memory engine 214 of FIG. 2, and marks any unsent directives from the prior plan as superseded. In some embodiments, operator web console 218 of FIG. 2 displays the updated plan and directive states and accepts a pause or re plan command that user module 232 of FIG. 2 authenticates and routes to execution orchestration module 212 of FIG. 2 or directive plan generation engine 208 of FIG. 2 for application.

Figure 4A:
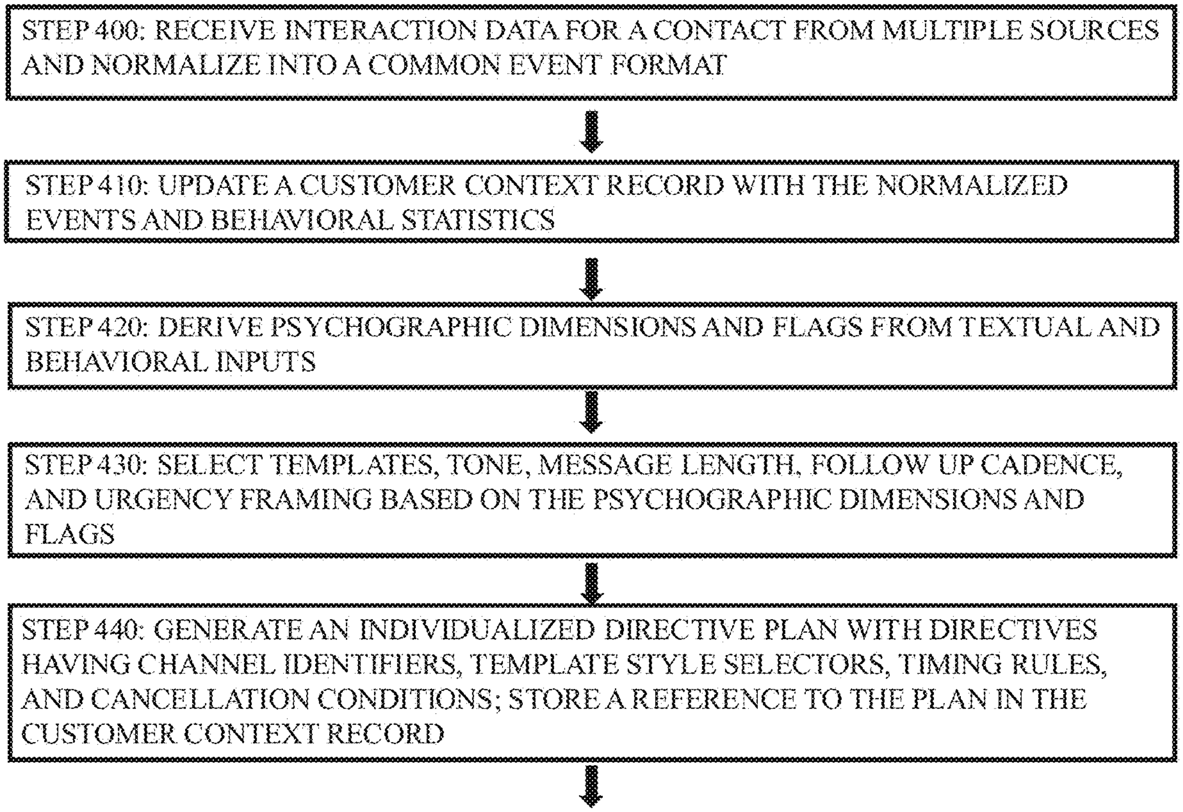
FIG. 4A illustrates a workflow of the disclosed method showing plan generation, orchestration across external platforms, outcome monitoring, and plan regeneration.

FIG. 4A illustrates a portion of a workflow executed by application program 200 of FIG. 2 on computing system 100 of FIG. 1. Processor 110 of FIG. 1 executes application instructions 140 of FIG. 1 that implement data ingestion and normalization module 202 of FIG. 2, psychographic analysis engine 206 of FIG. 2, template playbook store 204 of FIG. 2, directive plan generation engine 208 of FIG. 2, and customer context memory engine 214 of FIG. 2 to perform Steps 400 through 440.

Step 400 receives interaction data for a contact from multiple sources and normalizes the interaction data into a common event format using data ingestion and normalization module 202 of FIG. 2. Data ingestion and normalization module 202 of FIG. 2 exposes authenticated HTTPS endpoints and message-broker consumers on network interface 165 of FIG. 1, validates request signatures and required headers, parses provider payloads with source adapters, maps provider fields to canonical attributes including contact identifier, event type, timestamp, channel, payload hash, and provider identifier, deduplicates by comparing the payload hash within a sliding window, resolves the contact identifier by querying customer context memory engine 214 of FIG. 2, and emits a normalized event object conforming to the common schema into data storage 150 of FIG. 1 while returning a stable event identifier for downstream reference.

In some embodiments, data ingestion and normalization module 202 of FIG. 2 performs probabilistic identity resolution when a deterministic key is unavailable by computing similarity across hashed emails, device identifiers, and session metadata, assigning a confidence score, and writing the confidence score with the normalized event so merge logic in customer context memory engine 214 of FIG. 2 honors the score during updates.

Step 410 updates a Customer Context Record with the normalized events and behavioral statistics using customer context memory engine 214 of FIG. 2. Customer context memory engine 214 of FIG. 2 executes an event reducer that merges fields from the normalized event into the Customer Context Record, sets last-seen channel and timestamps, increments counters, computes rolling metrics including decay-weighted engagement and reply-latency distributions, writes a provenance pointer to the normalized event in data storage 150 of FIG. 1, persists the updated Customer Context Record, and publishes a change notification over network interface 165 of FIG. 1 so subscribed components receive an update signal without polling.

In some embodiments, customer context memory engine 214 of FIG. 2 represents the Customer Context Record as a document with sub-documents for psychographic dimensions, directive states, and outcome history to enable atomic updates, while alternative embodiments store the Customer Context Record in a relational schema with tables for contacts, plans, directives, events, and outcomes linked by foreign keys to facilitate analytical queries.

Step 420 derives psychographic dimensions and flags from textual and behavioral inputs using psychographic analysis engine 206 of FIG. 2. Psychographic analysis engine 206 of FIG. 2 retrieves message text and metadata referenced by the normalized event in data storage 150 of FIG. 1, tokenizes text, generates embeddings with a transformer language model loaded by processor 110 of FIG. 1, aggregates behavior features such as reply latency, open-to-click ratio, channel-specific engagement, and recency-weighted activity from the event history read through customer context memory engine 214 of FIG. 2, fuses embeddings and behavior features in a trained classifier, and writes scores and flags for relationship orientation, detail orientation, decisiveness, value sensitivity, skepticism, and engagement velocity to the Customer Context Record via customer context memory engine 214 of FIG. 2.

In some embodiments, psychographic analysis engine 206 of FIG. 2 performs on-device inference for privacy-sensitive deployments and synchronizes only aggregate scores and model-version identifiers to customer context memory engine 214 of FIG. 2, while other embodiments centralize inference on an application server to leverage hardware accelerators for low-latency batch processing.

Step 430 selects templates, tone, message length, follow-up cadence, and urgency framing based on the psychographic dimensions and flags by querying template playbook store 204 of FIG. 2. Template playbook store 204 of FIG. 2 returns template identifiers and parameter policies that match the psychographic values, validates variable placeholders against fields present in the Customer Context Record maintained by customer context memory engine 214 of FIG. 2, and supplies constraints such as quiet hours, frequency caps, and jurisdiction tags that directive plan generation engine 208 of FIG. 2 must honor during composition.

Step 440 generates an individualized directive plan with directives having a channel identifier, a template style selector, a timing rule, and a cancellation condition and stores a reference to the plan in the Customer Context Record using directive plan generation engine 208 of FIG. 2. Directive plan generation engine 208 of FIG. 2 reads the current Customer Context Record from customer context memory engine 214 of FIG. 2, combines selections returned by template playbook store 204 of FIG. 2 with status and channel preferences stored in the Customer Context Record, constructs directive records that encode timing as an absolute time or a delay and cancellation as predicates over events and context fields, writes the individualized directive plan to data storage 150 of FIG. 1, and writes an active-plan reference into the Customer Context Record through customer context memory engine 214 of FIG. 2.

In some embodiments, directive plan generation engine 208 of FIG. 2 computes a rolling horizon of directives and records supersession markers for directives that a later regeneration replaces so execution orchestration module 212 of FIG. 2 transitions any unsent directives from a prior plan to a superseded state without ambiguity.

Figure 4B:
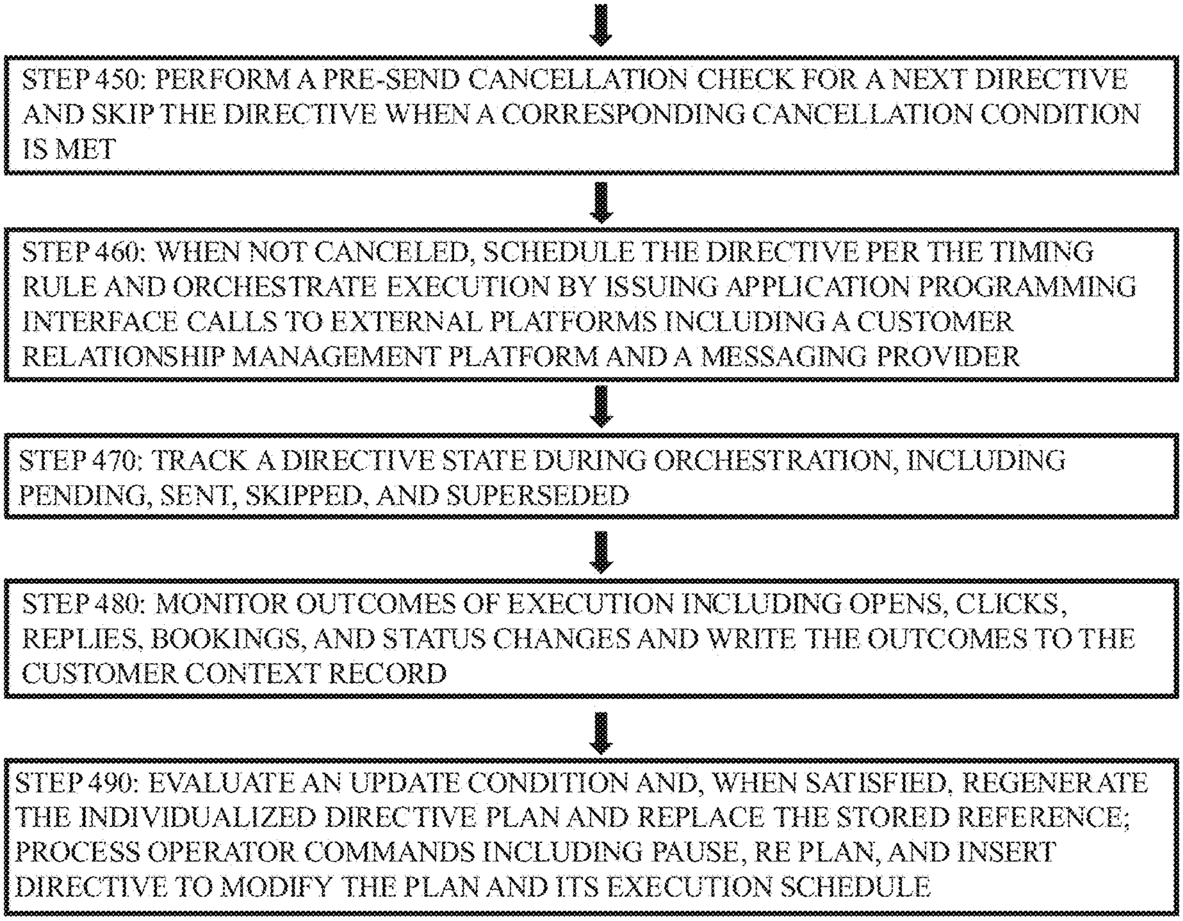
FIG. 4B illustrates a continuation of the workflow in FIG. 4A.

FIG. 4B continues the workflow executed by application program 200 of FIG. 2 on computing system 100 of FIG. 1. Processor 110 of FIG. 1 executes application instructions 140 of FIG. 1 that implement execution orchestration module 212 of FIG. 2, API and messaging integration 210 of FIG. 2, customer context memory engine 214 of FIG. 2, feedback processing engine 230 of FIG. 2, template playbook store 204 of FIG. 2, directive plan generation engine 208 of FIG. 2, operator web console 218 of FIG. 2, and user module 232 of FIG. 2 to perform Steps 450 through 490 shown in FIG. 4B.

Step 450 performs a pre send cancellation check for a next directive using execution orchestration module 212 of FIG. 2. Execution orchestration module 212 of FIG. 2 evaluates the directive's cancellation condition as predicates over fields in the current Customer Context Record read from customer context memory engine 214 of FIG. 2 and compares those predicates to normalized events recently written by data ingestion and normalization module 202 of FIG. 2. When a predicate evaluates true, execution orchestration module 212 of FIG. 2 writes a directive state of skipped to the Customer Context Record through customer context memory engine 214 of FIG. 2 and advances to a subsequent directive.

Step 460 schedules the directive per the timing rule and orchestrates execution by issuing application programming interface calls to external platforms using API and messaging integration 210 of FIG. 2 when the directive is not canceled. Execution orchestration module 212 of FIG. 2 selects an execution slot that satisfies the directive's timing rule and platform throughput limits, creates a platform request that contains the channel identifier and the template style selector, and publishes the request to API and messaging integration 210 of FIG. 2. API and messaging integration 210 of FIG. 2 maps directive fields to provider payloads for a customer relationship management platform and for a messaging provider, signs requests using credentials issued by user module 232 of FIG. 2, transmits the requests via network interface 165 of FIG. 1, and records acknowledgments and external message identifiers in data storage 150 of FIG. 1.

In some embodiments, execution orchestration module 212 of FIG. 2 uses a transactional outbox persisted in data storage 150 of FIG. 1 so that the platform request and the directive-state transition described below commit atomically, which prevents duplicate sends during retries. In some embodiments, API and messaging integration 210 of FIG. 2 batches homogeneous provider calls and applies exponential backoff with jitter when a provider reports rate limiting.

Step 470 tracks a directive state during orchestration using execution orchestration module 212 of FIG. 2. Execution orchestration module 212 of FIG. 2 writes state transitions of pending, sent, skipped, and superseded to the Customer Context Record via customer context memory engine 214 of FIG. 2 and stores the external message identifiers returned by API and messaging integration 210 of FIG. 2 in association with the directive so that outcomes correlate to a specific send.

In some embodiments, execution orchestration module 212 of FIG. 2 maintains a priority queue across multiple contacts to respect organization level frequency caps returned by template playbook store 204 of FIG. 2 and to prefer directives with near term timing rules.

Step 480 monitors outcomes of execution including opens, clicks, replies, bookings, and status changes and writes the outcomes to the Customer Context Record using feedback processing engine 230 of FIG. 2. Feedback processing engine 230 of FIG. 2 accepts webhook callbacks exposed by API and messaging integration 210 of FIG. 2, validates provider signatures, normalizes each outcome to the common event schema used by data ingestion and normalization module 202 of FIG. 2, correlates the outcome to the stored external message identifier in data storage 150 of FIG. 1, and writes an outcome event and any directive-state transition such as superseded to the Customer Context Record through customer context memory engine 214 of FIG. 2.

In some embodiments, feedback processing engine 230 of FIG. 2 computes decay weighted engagement and channel responsiveness metrics from recent outcomes and stores those metrics in fields consumed by directive plan generation engine 208 of FIG. 2 for later planning.

Step 490 evaluates an update condition and, when satisfied, regenerates the individualized directive plan and replaces the stored reference; Step 490 also processes operator commands to modify the plan and its execution schedule. Feedback processing engine 230 of FIG. 2 evaluates update-condition predicates using outcomes and the current status stored in the Customer Context Record retrieved from customer context memory engine 214 of FIG. 2. When the predicates evaluate true, feedback processing engine 230 of FIG. 2 issues a regeneration request to directive plan generation engine 208 of FIG. 2 with a reason code. Directive plan generation engine 208 of FIG. 2 reads the Customer Context Record, consults template playbook store 204 of FIG. 2 for applicable templates and constraints, composes a replacement individualized directive plan, writes the replacement plan to data storage 150 of FIG. 1, updates the active-plan reference in the Customer Context Record through customer context memory engine 214 of FIG. 2, and marks any remaining unsent directives in the prior plan as superseded. Operator web console 218 of FIG. 2 accepts authenticated commands including pause, re plan, and insert directive, which user module 232 of FIG. 2 authorizes and routes to execution orchestration module 212 of FIG. 2 or directive plan generation engine 208 of FIG. 2 to adjust scheduling and plan content accordingly.

Figure 5:
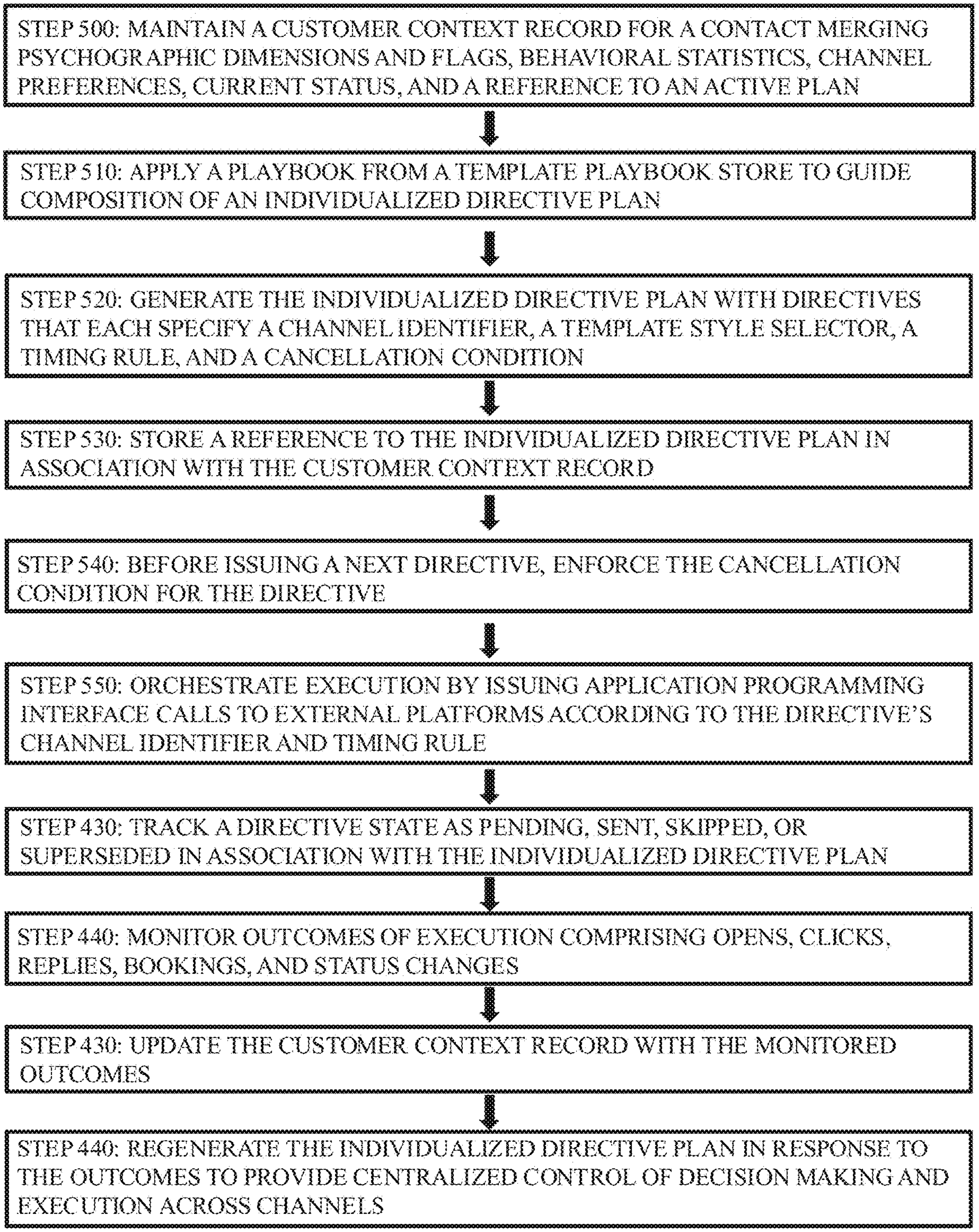
FIG. 5 illustrates a workflow of the disclosed software product on a non-transitory computer readable medium to maintain context, execute directives, and adapt based on results.

FIG. 5 illustrates a workflow executed by application program 200 of FIG. 2 on computing system 100 of FIG. 1. Processor 110 of FIG. 1 executes application instructions 140 of FIG. 1 that implement customer context memory engine 214 of FIG. 2, template playbook store 204 of FIG.

2, directive plan generation engine 208 of FIG. 2, and execution orchestration module 212 of FIG. 2 to perform Steps 500 through 540 shown in FIG. 5.

Step 500 maintains a Customer Context Record for a contact that merges psychographic dimensions and flags, behavioral statistics, channel preferences, current status, and a reference to an active plan using customer context memory engine 214 of FIG. 2. Customer context memory engine 214 of FIG. 2 stores the Customer Context Record in data storage 150 of FIG. 1, caches frequently read fields in memory 120 of FIG. 1, applies event reducers to update behavioral statistics, and keeps a consistent reference to an active plan by writing a plan identifier and version metadata. Customer context memory engine 214 of FIG. 2 exposes read and write operations that are atomic at the record level so that execution orchestration module 212 of FIG. 2 and directive plan generation engine 208 of FIG. 2 observe coherent state.

In some embodiments, customer context memory engine 214 of FIG. 2 implements the Customer Context Record as a document with sub documents for traits, preferences, status, and plan metadata to enable single write updates, while alternative embodiments use a relational schema with tables for contacts, plans, directives, events, and outcomes linked by foreign keys to support analytical queries without materializing the entire record.

Step 510 applies a playbook from template playbook store 204 of FIG. 2 to guide composition of an individualized directive plan. Template playbook store 204 of FIG. 2 receives a plan context containing the psychographic dimensions and flags, channel preferences, and current status pulled from the Customer Context Record via customer context memory engine 214 of FIG. 2, evaluates selection rules, and returns a set of template identifiers and parameter policies. Template playbook store 204 of FIG. 2 validates variable placeholders against fields present in the Customer Context Record and returns constraint metadata such as quiet hours, frequency caps, and jurisdiction tags to be enforced during composition and execution.

In some embodiments, template playbook store 204 of FIG. 2 namespaces assets by tenant and returns versioned selections so operator web console 218 of FIG. 2 reproduces the exact template and parameter set used for audit.

Step 520 generates the individualized directive plan with directives that each specify a channel identifier, a template style selector, a timing rule, and a cancellation condition using directive plan generation engine 208 of FIG. 2. Directive plan generation engine 208 of FIG. 2 reads the Customer Context Record from customer context memory engine 214 of FIG. 2, incorporates the template identifiers and parameter policies returned by template playbook store 204 of FIG. 2, and constructs directive records. Each directive record encodes the channel identifier, binds the template style selector to a concrete template, expresses a timing rule as an absolute timestamp or delay expression, and defines a cancellation condition as predicates over events and fields in the Customer Context Record. Directive plan generation engine 208 of FIG. 2 writes the individualized directive plan to data storage 150 of FIG. 1.

In some embodiments, directive plan generation engine 208 of FIG. 2 builds a rolling horizon of future directives and associates precedence values so execution orchestration module 212 of FIG. 2 schedules nearer items first, while alternative embodiments generate a single next directive per regeneration to minimize stored state.

Step 530 stores a reference to the individualized directive plan in association with the Customer Context Record using customer context memory engine 214 of FIG. 2. Customer context memory engine 214 of FIG. 2 writes the plan identifier, plan version, and a timestamp to the plan metadata section of the Customer Context Record and marks any prior plan reference as inactive. Customer context memory engine 214 of FIG. 2 publishes a change notification over network interface 165 of FIG. 1 so execution orchestration module 212 of FIG. 2 can read the correct plan for delivery.

Step 540 enforces the cancellation condition for a next directive before issuing the directive using execution orchestration module 212 of FIG. 2. Execution orchestration module 212 of FIG. 2 reads the current Customer Context Record through customer context memory engine 214 of FIG. 2, evaluates the directive's cancellation predicates against the latest fields and any recently normalized events written by data ingestion and normalization module 202 of FIG. 2, and determines whether to skip the directive. When the predicates evaluate to false, execution orchestration module 212 of FIG. 2 admits the directive to the scheduling queue for later orchestration; when true, execution orchestration module 212 of FIG. 2 writes a directive state of skipped to the Customer Context Record and advances to a subsequent directive without issuing network calls.

Step 550 orchestrates execution by issuing application programming interface calls to external platforms according to a directive's channel identifier and timing rule using execution orchestration module 212 of FIG. 2. Execution orchestration module 212 of FIG. 2 selects a send slot that satisfies the timing rule and provider throughput limits, renders a payload from the template style selector using fields read from the Customer Context Record via customer context memory engine 214 of FIG. 2, and submits a platform request to API and messaging integration 210 of FIG. 2. API and messaging integration 210 of FIG. 2 maps the request to a provider specific format for a customer relationship management platform or a messaging provider, signs the request with credentials issued by user module 232 of FIG. 2, transmits the request through network interface 165 of FIG. 1, and stores the provider acknowledgment and message identifier in data storage 150 of FIG. 1.

In some embodiments, execution orchestration module 212 of FIG. 2 persists the platform request and a pending state in a transactional outbox in data storage 150 of FIG. 1 so the send and state transition commit atomically during retries. In some embodiments, API and messaging integration 210 of FIG. 2 batches homogeneous provider calls and applies exponential backoff with jitter when a provider signals rate limiting, while an alternative embodiment opens a short-lived connection pool per provider to reduce connection setup time for burst sends.

Step 560 tracks a directive state as pending, sent, skipped, or superseded in association with the individualized directive plan using execution orchestration module 212 of FIG. 2. Execution orchestration module 212 of FIG. 2 updates the Customer Context Record through customer context memory engine 214 of FIG. 2 when a directive is scheduled, when API and messaging integration 210 of FIG. 2 confirms dispatch, when a cancellation condition causes a skip, or when a regeneration replaces unsent directives, and stores the provider message identifier alongside the state for later correlation.

In some embodiments, execution orchestration module 212 of FIG. 2 maintains a priority queue across contacts to respect organization frequency caps returned by template playbook store 204 of FIG. 2 and promotes directives with near term timing rules, while an alternative embodiment uses a earliest deadline first scheduler for channels that impose strict windowing.

Step 570 monitors outcomes of execution comprising opens, clicks, replies, bookings, and status changes using feedback processing engine 230 of FIG. 2. Feedback processing engine 230 of FIG. 2 accepts webhook callbacks exposed by API and messaging integration 210 of FIG. 2, validates provider signatures, normalizes each outcome to the common event schema used by data ingestion and normalization module 202 of FIG. 2, correlates the outcome to the stored provider message identifier in data storage 150 of FIG. 1, and emits a normalized outcome event for context updates.

In some embodiments, feedback processing engine 230 of FIG. 2 also polls platform logs on a schedule to reconcile missed callbacks and marks reconciled outcomes with a provenance field so operator web console 218 of FIG. 2 displays the data source.

Step 580 updates the Customer Context Record with the monitored outcomes using customer context memory engine 214 of FIG. 2. Customer context memory engine 214 of FIG. 2 applies an outcome reducer that appends the outcome entry, refreshes rolling engagement metrics, updates channel responsiveness, and records any directive state changes such as superseded when a later plan replaced an unsent directive, then persists the modified Customer Context Record in data storage 150 of FIG. 1 and publishes a change notification over network interface 165 of FIG. 1.

Step 590 regenerates the individualized directive plan in response to the outcomes to provide centralized control of decision making and execution across channels using directive plan generation engine 208 of FIG. 2. Feedback processing engine 230 of FIG. 2 evaluates configured update condition predicates against the updated Customer Context Record retrieved from customer context memory engine 214 of FIG. 2 and, when satisfied, issues a regeneration request with a reason code to directive plan generation engine 208 of FIG. 2. Directive plan generation engine 208 of FIG. 2 reads the current Customer Context Record, consults template playbook store 204 of FIG. 2 for applicable templates and constraints, composes a replacement individualized directive plan, writes the replacement plan to data storage 150 of FIG. 1, updates the active plan reference in the Customer Context Record through customer context memory engine 214 of FIG. 2, and marks any remaining unsent directives from the prior plan as superseded.

In some embodiments, directive plan generation engine 208 of FIG. 2 limits regeneration frequency with a debounce interval to reduce compute and provider calls, while an alternative embodiment performs immediate regeneration but restricts changes to the next directive only so downstream schedules remain stable.

In this disclosure, the various embodiments are described with reference to the flowchart illustrations and/or block diagrams of methods, apparatus (systems), and computer program products. Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks and/or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions and/or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrases "computing device" or "central processing unit" as is used herein means a computer hardware component that executes individual commands of a computer software program. It reads program instructions from a main or secondary memory and then executes the instructions one at a time until the program ends. During execution, the program may display information to an output device such as a monitor.

The term "execute" as is used herein in connection with a computer, console, server system or the like means to run, use, operate or carry out an instruction, code, software, program and/or the like.

References to modules, systems, or means for performing functions are intended to encompass tangible computing structures including processors executing machine instructions stored on non transitory computer readable media, memory circuits such as caches and device memory, data queues and buffers, and communication interfaces including buses and network adapters.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

It will be appreciated by persons skilled in the art that the present embodiment is not limited to what has been particularly shown and described hereinabove. A variety of modifications and variations are possible considering the above teachings without departing from the following claims.

What is claimed is:

1. A computer system comprising a processor and a memory storing instructions that when executed cause the processor to implement:

a data ingestion and normalization module configured to receive interaction data associated with a contact from multiple external systems and to normalize the interaction data into a common event format tied to the contact;

a psychographic analysis engine configured to derive psychographic dimensions and flags for the contact from textual content and behavioral patterns;

a data store maintaining a Customer Context Record for the contact that merges the psychographic dimensions and flags with behavioral statistics, channel preferences, current status, and a reference to an active plan;

a directive plan generation engine configured to generate for the contact an individualized directive plan comprising multiple directives, each directive including a channel identifier, a template style selector, a timing rule, and a cancellation condition;

an execution orchestration module configured to read the individualized directive plan and to trigger multi-channel execution by issuing application programming interface calls to the external systems while enforcing the cancellation condition for each directive and tracking a state of each directive;

a feedback processing engine configured to update the Customer Context Record based on observed outcomes and to regenerate the individualized directive plan upon satisfaction of an update condition so that a centralized brain both decides and executes the individualized directive plan across channels;

wherein the psychographic analysis engine maintains, for the contact, a psychographic vector that resides as an N by M floating-point array in graphics processing unit memory or accelerator memory and is updated asynchronously in real time, where N and M are positive integers; and an adaptive cognitive orchestration kernel configured to coordinate directive execution by scheduling work across multiple processing threads and across processor and accelerator compute units using asynchronous event queues, the adaptive cognitive orchestration kernel further configured to enforce multi-tenant isolation by allocating tokens per tenant and to defer work when a token allocation is exhausted, and to complete derivation of the psychographic dimensions and regeneration of the individualized directive plan within a bounded latency of less than twenty milliseconds per trigger event.

2. The computer system of claim 1, wherein the state of each directive includes pending, sent, skipped, and superseded.

3. The computer system of claim 1, wherein the external systems comprise a customer relationship management platform and a messaging provider, and the execution orchestration module schedules and sends actions through the customer relationship management platform and the messaging provider based on the individualized directive plan.

4. The computer system of claim 1, wherein the feedback processing engine monitors opens, clicks, replies, bookings, and status changes as outcomes used to update the Customer Context Record and to trigger regeneration of the individualized directive plan.

5. The computer system of claim 1, wherein the psychographic analysis engine computes psychographic dimensions comprising relationship orientation, detail orientation, decisiveness, value sensitivity, skepticism, and engagement velocity that drive template selection, message length, follow up frequency, and urgency framing.

6. The computer system of claim 1, wherein the cancellation condition for a directive comprises detection of an external event selected from appointment booked or do not contact and the execution orchestration module enforces the cancellation condition before issuing each directive.

7. The computer system of claim 1, wherein the Customer Context Record stores a unified context per contact used as a live decision substrate and is updated immediately upon receipt of normalized events to trigger changes to the individualized directive plan.

8. A computer implemented method comprising:

receiving, by a processor, interaction data associated with a contact from multiple sources and normalizing the interaction data into a common event format;

updating, by the processor, a Customer Context Record for the contact using the normalized interaction data;

deriving, by the processor, psychographic dimensions and flags for the contact from textual content and behavioral patterns contained in the normalized interaction data;

generating, by the processor, an individualized directive plan for the contact that includes a plurality of directives with channel identifiers, template style selectors, timing rules, and cancellation conditions;

orchestrating, by the processor, execution of the individualized directive plan by issuing application programming interface calls to external platforms and tracking a directive state for each of the plurality of directives;

monitoring, by the processor, outcomes of the execution and regenerating the individualized directive plan when an update condition is satisfied so that a centralized brain both decides and executes the individualized directive plan across channels;

wherein deriving the psychographic dimensions and flags comprises maintaining, for the contact, a psychographic vector as an N by M floating-point array in graphics processing unit memory or accelerator memory and updating the psychographic vector asynchronously in real time, where N and M are positive integers;

coordinating, by an adaptive cognitive orchestration kernel, execution of the individualized directive plan by scheduling work across multiple processing threads and across processor and accelerator compute units using asynchronous event queues;

enforcing multi-tenant isolation during the orchestrating by allocating tokens per tenant and deferring work when a token allocation is exhausted; and completing the deriving of the psychographic dimensions and flags and the regenerating of the individualized directive plan within a bounded latency of less than twenty milliseconds per trigger event.

9. The method of claim 8, wherein the outcomes comprise opens, clicks, replies, bookings, and status changes.

10. The method of claim 8, further comprising checking the cancellation conditions for a next directive before issuing the next directive and skipping the next directive when a corresponding cancellation condition is met.

11. The method of claim 8, wherein generating the individualized directive plan comprises selecting templates, tone, message length, follow up cadence, and urgency framing based at least in part on the psychographic dimensions and flags.

12. The method of claim 8, wherein the Customer Context Record stores a reference to the individualized directive plan and the regenerating includes replacing the individualized directive plan with a newly generated individualized directive plan responsive to the outcomes.

13. A non-transitory computer readable medium storing instructions that, when executed by one or more processors, cause the processors to perform operations comprising:

maintaining, for a contact, a Customer Context Record that merges psychographic dimensions and flags, behavioral statistics, channel preferences, current status, and a reference to an active plan;

generating an individualized directive plan for the contact including a plurality of directives with channel identifiers, template style selectors, timing rules, and cancellation conditions;

enforcing the cancellation conditions while orchestrating execution of the individualized directive plan by issuing application programming interface calls to external platforms and tracking a directive state;

regenerating the individualized directive plan in response to outcomes to provide centralized control of decision making and execution across channels;

wherein the operations further comprise deriving the psychographic dimensions and flags for the contact from textual content and behavioral patterns and maintaining, for the contact, a psychographic vector that resides as an N by M floating-point array in graphics processing unit memory or accelerator memory and is updated asynchronously in real time, where N and M are positive integers;

coordinating, by an adaptive cognitive orchestration kernel, execution of the individualized directive plan by scheduling work across multiple processing threads and across processor and accelerator compute units using asynchronous event queues;

enforcing multi-tenant isolation during the orchestrating by allocating tokens per tenant and deferring work when a token allocation is exhausted; and completing the deriving of the psychographic dimensions and flags and the regenerating of the individualized directive plan within a bounded latency of less than twenty milliseconds per trigger event.

14. The non-transitory computer readable medium of claim 13, wherein the operations further comprise monitoring the outcomes comprising opens, clicks, replies, bookings, and status changes and updating the Customer Context Record with the outcomes.

15. The non-transitory computer readable medium of claim 13, wherein the operations further comprise identifying a directive state as pending, sent, skipped, or superseded and storing the directive state in association with the individualized directive plan.

16. The non-transitory computer readable medium of claim 13, wherein the operations further comprise applying a playbook from a template playbook store to guide composition of the individualized directive plan.

* * * * *